United States Patent [19]

Harvest et al.

[11] Patent Number: 4,535,280
[45] Date of Patent: Aug. 13, 1985

[54] STABILIZING CIRCUIT FOR AN INVERSE RECTIFIER MOTOR CONTROL

[75] Inventors: Nils-Ole Harvest; Anna Melamed, both of Nordborg, Denmark

[73] Assignee: Danfoss A/S, Nordborg, Denmark

[21] Appl. No.: 594,300

[22] Filed: Mar. 28, 1984

[30] Foreign Application Priority Data

Apr. 12, 1983 [DE] Fed. Rep. of Germany ....... 3313124

[51] Int. Cl.[3] .............................................. H02P 5/40
[52] U.S. Cl. ..................................... 318/798; 318/806
[58] Field of Search ................... 318/798, 806, 702

[56] References Cited

U.S. PATENT DOCUMENTS 3,753,063  8/1973  Graf ...................................... 318/806
3,800,199  3/1974  Weigand ............................... 318/701
3,935,518  1/1976  Yatsuk et al. ........................ 318/805
4,186,334  1/1980  Hirata ................................... 318/805
4,437,050  3/1984  Overzet ................................ 318/807

Primary Examiner—David Smith, Jr.
Attorney, Agent, or Firm—Wayne B. Easton

[57] ABSTRACT

The invention relates to a stabilizing circuit for an inverse rectifier motor control which includes a D.C. voltage supply having a D.C. voltage regulator followed by a smoothing intermediate circuit. A frequency control circuit converts the supply voltage from the intermediate circuit to a frequency control voltage. Following the frequency control circuit is a generator for converting the frequency control voltage to control signals for the inverse rectifier motor control.

10 Claims, 6 Drawing Figures

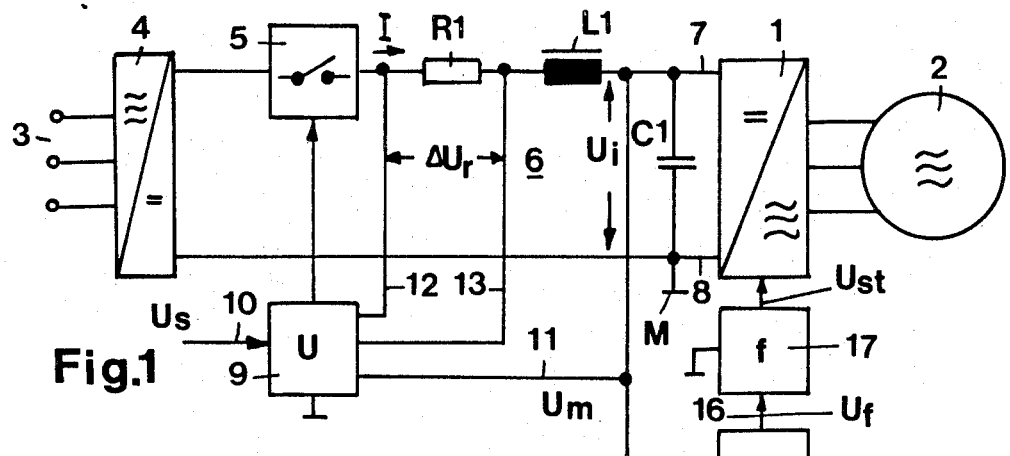
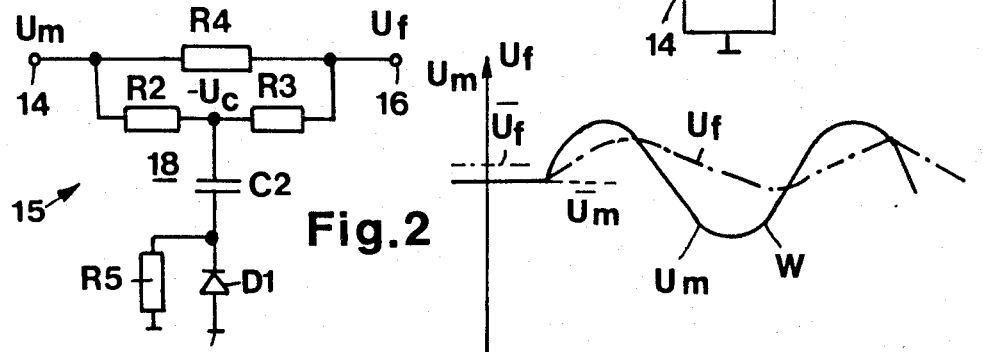
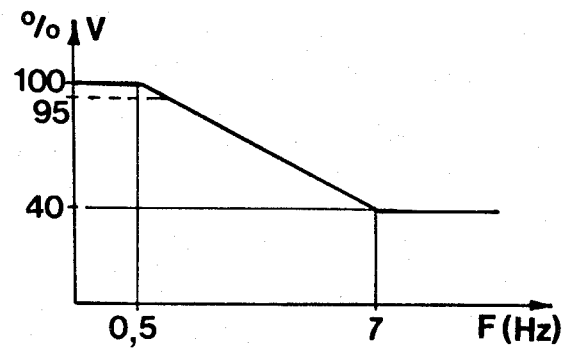
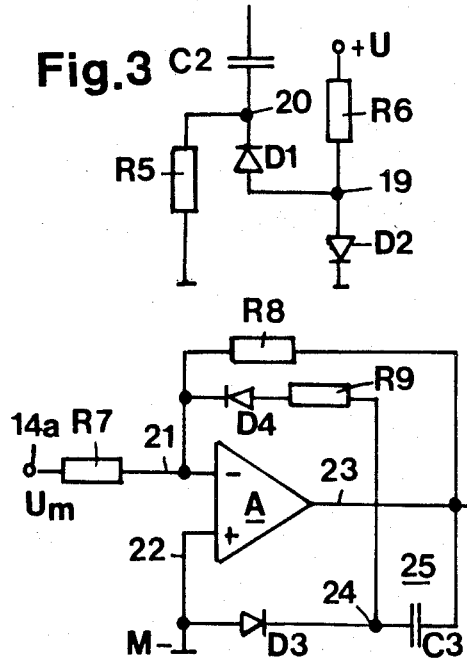

STABILIZING CIRCUIT FOR AN INVERSE RECTIFIER MOTOR CONTROL

The invention relates to a stabilizing circuit for an inverse rectifier motor control, comprising a D.C. voltage supply having a D.C. voltage regulator followed by a smoothing intermediate circuit, a generator for the inverse rectifier frequency which is substantially proportional to a frequency control voltage, and a frequency control circuit which depends on the existing voltage of the intermediate circuit and causes the frequency control circuit to follow a measuring voltage equal or proportional to the existing voltage, a frequency dependent filter being provided for determining A.C. voltage components of the existing voltage of the intermediate circuit.

In the operation of a motor energised by way of an inverse rectifier, various conditions of instability can arise, for example if the load driven by the motor changes suddenly or if a new speed is to be set for the motor quickly by changing the intermediate circuit voltage. These instabilities cause the motor to pendulate, electrical energy thus flowing to and fro between the motor and the filter elements of the intermediate circuit. Accordingly, the desired D.C. voltage of the intermediate circuit has an A.C. voltage component superimposed on it. The frequency and amplitude of this A.C. voltage component depends on the particular conditions. The A.C. voltage component may be very marked if, on account of the participating electrical components, particularly the smoothing choke and the smoothing condenser in the intermediate circuit, resonance conditions are set up.

A stabilising circuit of the aforementioned kind is therefore already known (U.S. Pat. No. 3,986,100), in which the frequency control circuit only ensures that the frequency control voltage and thus the inverse rectifier frequency rigidly follow the existing voltage of the intermediate circuit at which, however, a voltage control circuit is subjected to the influence of the A.C. voltage component of the existing voltage of the intermediate circuits. For this purpose, the voltage control circuit has a first branch in which an existing/desired value comparison is conducted for the voltage of the intermediate circuit, a second branch in which, for the purpose of keeping the motor current constant, an existing/desired value comparison is conducted of the voltage drop at a resistor through which the current flows, and a band-pass filter through which the A.C. voltage component of the intermediate circuit voltage is fed to the second branch at a predetermined frequency range. In this case, the A.C. voltage component acts in the sense of a feedback coupling. This influence on the voltage control circuit may keep the intermediate circuit voltage and the inverse rectifier frequency reasonably constant. However, this is only possible for a particular oscillating frequency for which the regulating circuit of the voltage control circuit has been desigend. Effective damping of all possible pendulations is not available.

Another stabilising circuit is known (DE-OS No. 31 35 764), in which the frequency control voltage does not follow the existing voltage but the desired voltage of the voltage control circuit. In this case, the desired voltage can be fed by way of a band filter with a proportion of a change in the existing value of the intermediate circuit, particularly an undesired transient surge. Consequently, the inverse rectifier frequency and thus the motor speed will rise with an increase in the existing voltage of the intermediate circuit. This circuit is incomplete because, with the aid of the frequency control voltage obtained in this manner, one only obtains the advantages already obtaining by directly deriving the frequency control voltage from the existing voltage, namely the higher speed at higher intermediate circuit voltage.

The invention is based on the problem of providing a stabilising circuit of the aforementioned kind which strongly reduces the pendulations of the motor and oscillations superimposed on the D.C. voltage in the intermediate circuit in practically every manner of operation.

This problem is solved according to the invention in that the frequency control circuit contains the frequency dependent filter and is so designed that, with increasing oscillation frequency of the A.C. voltage components, the frequency control voltage is corrected relatively to the measuring voltage in two respects:

(1) The mean value of the frequency control voltage is altered relatively to the mean value of the measuring voltage in the sense of increasing the inverse rectifier frequency.

(2) The amplitude of the A.C. voltage component of the frequency control voltage is reduced relatively to that of the measuring voltage.

The result of the first correction of the frequency control voltage is that the mean speed of the motor assumes a higher value than the mean value of the existing voltage of the intermediate circuit. The pendulum energy is therefore used up in the motor because it is forced to run somewhat quicker than the speed corresponding to the intermediate circuit voltage. The second correction ensures that the changes in the inverse rectifier frequency are smaller than the changes in the existing voltage of the intermediate circuit. The speed changes of the motor occasioned by the inverse rectifier frequency are therefore kept intentionally low. Altogether, therefore, the pendulations and oscillations disappear after a short time. This applies to all possible frequencies of the A.C. voltage components encountered during operation because pendulations at a higher frequency are counteracted with a stronger increase of the mean value of the control voltage.

Advantageously, the frequency dependent filter is a low-pass filter which leaves the frequency control voltage uninfluenced below a first threshold of the oscillation frequency and corrects the frequency control voltage to an increasing extent above the threshold value. Low oscillation frequencies which do not affect the operation of the inverse rectifier motor control are therefore put up with. The low-pass filter therefore only acts at higher frequencies, for example above 0.5 Hz. Such a filter design presents no difficulties.

It is also favourable if the low-pass filter has a second threshold value corresponding to a higher oscillation frequency, at least the amplitude of the one half wave of the A.C. voltage component of the frequency control voltage being a fixed fraction of that of the measuring voltage above the second threshold value. In this way, one ensures that even at higher oscillation frequencies there will be a residual amplitude for the frequency control, even if a stronger reduction of these amplitudes was already provided in the region of smaller oscillation frequencies.

There are constructional advantages if the frequency control circuit comprises a condenser which is charged and discharged depending on the measuring voltage, and if the frequency control voltage is influenced not only by the measuring voltage but also by the condenser voltage. This makes it possible to correct the frequency control voltage in two respects in a simple manner. By reason of the effectiveness of the measuring voltage and condenser voltage, there is a rise in the mean value of the frequency control voltages and a reduction in its waviness.

This condenser can even form the frequency dependent filter together with resistors, this resulting in still further circuit simplifications.

In particular, the condenser is in series with a diode which is fractionally bridged by an additional resistor. Since the additional resistor is effective in only one current direction, a different time constant can easily be achieved for charging and discharging.

A very simple embodiment is characterised in that the frequency control circuit comprises a longitudinal branch with the shunt connection of two-series-connected longitudinal resistors and a parallel resistor as well as a transverse branch with the series-connection of the condenser branching off between the two longitudinal resistors and the diode that is bridged by the additional resistor. These few stated components enable all the functions of the stabilising circuit to be achieved.

In a different example, the frequency control circuit comprises an amplifier of which the inverting input can be fed with the measuring voltage by way of a preliminary resistor, the non-inverting input is applied to a reference potential, and the output is connected to the non-inverting input by way of the series circuit of condenser and diode as well as the inverting input by way of a counter-coupling resistor, the additional resistor branching off between the condenser and diode and being connected to the inverting input by way of an additional diode poled in the opposite sense. By using the amplifier, losses in the filter are avoided during charging and discharging of the condenser.

It is also favourable if the end of the diode remote from the condenser is connected to a voltage which is offset from the reference potential by a diode voltage drop. In particular, the end of the diode remote from the condenser may be connected to an oppositely poled diode which is applied on the one hand to the reference potential and on the other hand by way of a resistor to a voltage with a potential opposite to the measuring or control voltage. In this way, the end of the condenser adjacent to the diode can be accurately kept at reference potential, which facilitates particularly accurate operation.

Preferred examples of the invention will now be described in more detail with reference to the drawing, wherein:

FIG. 1 is a block circuit diagram of an inverse rectifier motor control with the stabilizing circuit according to the invention;

FIG. 2 shows an embodiment of the frequency control circuit;

FIG. 3 shows a modification of the FIG. 3 control circuit;

FIG. 4 is a second example of the frequency control circuit;

FIG. 5 is a graph of the measuring voltage ($U_m$) and the inverse rectifier frequency f plotted against time, and FIG. 6 is a graph of the amplification factor V for the amplitude of the A.C. voltage component.

In FIG. 1, an inverse rectifier 1 is provided for driving an A.C. motor 2. The voltage supply is from a three-phase mains 3 by way of a three-phase bridge rectifier 4, a D.C. voltage regulator 5 and an intermediate circuit 6 having a longitudinal choke L1 and a transverse condenser C1 for smoothing purposes. Accordingly, an existing value $U_i$ for the intermediate circuit is available between the two D.C. voltage conductors 7 and 8.

The direct current regulator 5 which produces the existing voltage $U_i$ for example by pulse modulation of the constant D.C. voltage made available by the rectifier 4 is regulated by a voltage control circuit 9. The latter is amplified by way of an input 10 with a desired value voltage $U_s$ and by way of a line 11 with a measuring voltage $U_m$ equal to or proportional to the existing voltage $U_i$. In addition, the voltage control circuit 9 is connected by two lines 12 and 13 to the two ends of a measuring resistor R1. The voltage drop $\Delta U_r$ at this measuring resistor is therefore a measure of the current I fed to the motor. The D.C. voltage regulation can be such that the existing voltage $U_i$ of the intermediate circuit remains constant, the motor current I remains constant, or both parameters are partially considered. The measuring voltage $U_m$ is also fed to the input 14 of a frequency control circuit 15 which, after correction of the measuring voltage, delivers at its output 16 a frequency control voltage $U_f$ to a generator 17 for the inverse rectifier frequency f. In particular, this generator comprises a voltage controlled oscillator which, after appropriate signal preparation, delivers control signals $U_{st}$ to the controlled semi-conductor switching elements of the inverse rectifier 1. In normal operation, the frequency control circuit 15 is ineffective so that the inverse rectifier frequency f accurately follows the existing voltage $U_i$ of the intermediate circuit.

FIG. 2 shows in more detail one embodiment of the frequency control circuit 15. In a longitudinal branch, there is provided between the input 14 and output 16 the shunt connection of two series-connected resistors R2 and R3 and a parallel resistor R4. A transverse branch branching off between the two resistors R2 and R3 contains a condenser C2 in series with a diode D1 and an additional resistor R5 bridging the diode. The diode D1 and additional resistor R5 are applied to the reference potential M, for example earth, which also applies to the measuring voltage $U_m$ and the frequency control voltage $U_f$.

The longitudinal resistors R2 and R3 form, together with the condenser C2, a low-pass filter 18 designed so that it opens only when exceeding a first threshold value of the oscillation frequency F of the A.C. voltage component of the measuring voltage $U_m$ and takes away an ever increasing current with a rise in frequency.

In operation, the condenser C2 charges to the value of the measuring voltage $U_m$. Charging takes place by way of the diode D1 and the resistor R2, i.e. at a comparatively low time constant. In contrast, if the measuring voltage falls below the condenser voltage, the condenser C2 discharges through the resistors R2 and R5. This results in a larger time constant. The condenser voltage $U_c$ therefore changes more slowly during charging than during discharging. Since the output 16 is connected by way of the resistor R3 to the condenser voltage $U_c$ and by way of the resistor R4 to the measuring voltage $U_m$, a frequency control voltage $U_f$ is obtained in which both of the aforementioned voltages have an influence. As a result, the frequency control voltage $U_f$ rises more rapidly during charging than it drops during discharging. Preferably, when the measuring voltage and the condenser voltage are different, the influence of the condenser voltage $U_c$ on the frequency control voltage $U_f$ is greater, this being achieved in that the resistor R4 is considerably larger than the resistor R3, preferably 2.5 times larger. When the frequency of the A.C. voltage component F exceeds a predetermined desired value, the resistors R2 and R5 form a voltage divider which keeps the amplitude ratio constant.

This leads to the manner of operation illustrated in FIG. 5. If interferences cause the existing voltage $U_i$ of the intermediate circuit and thus the measuring voltage $U_m$ to exhibit an A.C. voltage component W, which is superimposed on the mean value $\overline{U}_m$ of the D.C. voltage as shown strongly exaggerated in FIG. 5, the condenser C2 is alternately charged and discharged. Since the rise in the condenser voltage is slower than the drop and the measuring voltage $U_m$ influences the frequency control voltage $U_f$ together with the condenser voltage $U_c$, this control voltage and thus the inverse rectifier frequency f follow a course as shown in chain-dotted lines in FIG. 5. It will be seen that the mean value $\overline{U}_f$ of this frequency control voltage is above that of the measuring voltage and that the amplitude of the A.C. voltage component superimposed on this mean value is less than that of the measuring voltage. Since the inverse rectifier frequency f follows this frequency control voltage $U_f$, the average speed of the motor 2 rises so that pendulating energy is used up. In addition, the influence of the frequency on speed changes is reduced.

FIG. 3 differs from FIG. 2 in that the end of the diode D1 remote from the condenser C2 is not applied directly to the reference potential but to a point 19 disposed between a resistor R6 connected to a positive voltage and an oppositely poled diode D2 connected to reference potential M. The point 19 has a value above the reference potential that is higher by the amount of the diode voltage drop. Considering the oppositely directed voltage drop of the diode D1, the terminal 20 of condenser C2 connected thereto has precisely reference potential. Ideal conditions therefore obtain because, during transition from the charge to the discharged condition or vice versa, there will be no leap in the voltage.

FIG. 4 illustrates a modified control circuit 15a for the frequency control circuit 15. In this case there is an amplifier A of which the inverting input 21 is connected to the terminal 14a by way of a preresistor R7 whilst the non-inverting input 22 lies at reference potential M. The output 23 communicating with the terminal a communicates with the non-inverting input 22 by way of the series circuit of a condenser C3 and a diode D3 whilst the connection of the output 23 to the inverting input 21 takes place by way of a counter-coupled resistor R8. The point 24 between the condenser C3 and diode D3 is connected to the inverting input 21 by way of the series circuit of an additional resistor R9 and a diode D4 which is poled oppositely to the diode D3.

The manner of operation corresponds to FIG. 2 with the exception that no power affecting the output signal is utilized for charging and discharging the condenser C3. The condenser C3 is part of a low-pass filter 25. The condenser C3, the diode D3 and the additional resistor R3 co-operate similarly to the condenser C2, the diode D1 and the additional resistor R5.

In FIG. 6, the amplification factor V is plotted against the oscillation frequency F of the A.C. voltage component W of the intermediate circuit voltage, this factor showing to what extent the amplitude of the A.C. voltage component of the frequency control voltage $U_f$ is reduced relatively to the amplitude of the A.C. voltage component of the measuring voltage $U_m$. The curve in full lines applies to the FIG. 4 embodiment where no condenser losses have to be taken into account. The broken line applies to FIG. 2. In both cases, above the first threshold value of 0.5 Hz, the amplitude ratio drops to the second threshold value, for example 7 Hz. It then remains constant. An indication is included that the amplitude of the A.C. voltage component of the frequency control voltage $U_f$ is now only 40% of the amplitude of the A.C. voltage component of the measuring voltage $U_m$.

We claim:

1. A stabilizing circuit for an inverse rectifier motor control, comprising, a D.C. voltage supply having a D.C. voltage regulator followed by a smoothing intermediate circuit which outputs a supply voltage, a frequency control circuit for converting said supply voltage to a frequency control voltage, a generator for converting said frequency control voltage to control signals for said inverse rectifier motor control, a frequency dependent filter for for said control circuit, said frequency control circuit including longitudinal branch means having a main resistor and a shunt connection of two series connected resistors, said frequency control circuit including transverse branch means having parallel diode and resistor means and a capacitor connected in series therewith, said capacitor being connected between said series connected resistors, said longitudinal and transverse branches being responsive to an increased frequency of the A.C. voltage components of said supply voltage and being operable to charge said capacitor at a slower rate than the discharge thereof so that the output of said frequency control circuit is a summation of said supply voltage and the voltage of said capacitor to effect (1) an increase of the mean value of said frequency control voltage relative to the mean value of said supply voltage and (2) a reduction of the amplitude of the A.C. voltage component of said frequency control voltage relative to said A.C. voltage component of said supply voltage.

2. A stabilizing circuit according to claim 1 characterized in that said frequency dependent filter is a low-pass filter which leaves said frequency control voltage uninfluenced below a first threshold value of the oscillation frequency of said supply voltage and increasingly corrects said frequency control voltage above said threshold value.

3. A stabilizing circuit according to claim 2 characterized in that said low-pass filter has a second threshold value corresponding to a higher oscillation frequency of said supply voltage with at least the amplitude of the one half wave of said A.C. voltage component of said frequency control voltage being a fixed fraction of that of said supply voltage above the said second threshold value.

4. A stabilizing circuit according to claim 1 characterized in that said frequency control circuit includes a capacitor which is charged and discharged depending on said supply voltage with said frequency control voltage being influenced by said supply voltage and by the voltage of said capacitor.

5. A stabilizing circuit according to claim 4 characterized in that said capacitor and associated resistors comprise said frequency dependent filter.

6. A stabilizing circuit according to claim 4 including a diode in series with said capacitor, and a resistor bridging said diode.

7. A stabilizing circuit according to claim 6 characterized in that said frequency control circuit includes a longitudinal branch with the shunt connection of two longitudinal resistors connnected in series and a third resistor in parallel therewith, a transverse branch with the series circuit of said capacitor branching off between said two longitudinal resistors.

8. A stabilizing circuit according to claim 6 characterized in that the end of said diode remote from said capacitor is connected to a voltage offset from a reference potential by a diode voltage drop.

9. A stabilizing circuit according to claim 6 characterized in that the end of said diode remote from said capacitor is connected to an oppositely poled diode applied on the one hand to a reference potential and on the other hand by way of a resistor to a voltage having a potential opposite to that of said supply voltage or said frequency control voltage.

10. A stabilizing circuit for an inverse rectifier motor control, comprising, D.C. voltage supply having a D.C. voltage regulator followed by a smoothing intermediate circuit which outputs a supply voltage, a frequency control circuit for converting said supply voltage to a frequency control voltage, a generator for converting said frequency control votage to control signals for said inverse rectifier motor control, a frequency dependent filter for said control circuit responsive to an increased frequency A.C. voltage components of said supply voltage to (1) increase the mean value of said frequency control voltage relative to the mean value of said supply voltage and (2) reduce the amplitude of the A.C. voltage component of said frequency control voltage relative to said A.C. voltage components of said supply voltage, said frequency control circuit including an amplifier having an inverting input and a resistor connected thereto to which said voltage is fed, said amplifier having a non-inverting input to which is applied a reference potential, said amplifier having an output connected to said non-inverting input by a series circuit of a capacitor condenser and a diode and to said inverting input by way of a counter-coupling resistor and an additional resistor branching off between said capacitor and said diode and being connected to said inverting input by an additional diode poled in the opposite sense.

* * * * *